United States Patent [19]
Campbell

[11] Patent Number: 4,953,352
[45] Date of Patent: Sep. 4, 1990

[54] EXHAUST SYSTEM

[76] Inventor: Monty A. Campbell, 4989 Holt Blvd., Montclair, Calif. 91763

[21] Appl. No.: 304,239

[22] Filed: Jan. 31, 1989

Related U.S. Application Data

[63] Continuation-in-part of Ser. No. 107,870, Oct. 8, 1987, Pat. No. 4,800,719, which is a continuation of Ser. No. 769,995, Aug. 26, 1985, abandoned, which is a continuation of Ser. No. 461,863, Jan. 28, 1983, abandoned.

[51] Int. Cl.⁵ .............................................. F02B 27/02
[52] U.S. Cl. ......................................... 60/313; 60/323
[58] Field of Search ........................ 60/312, 313, 323; 181/240, 259, 265, 268, 274, 275, 257

[56] References Cited

U.S. PATENT DOCUMENTS

| | | |
|---|---|---|
| 1,413,351 | 4/1922 | Peters . |
| 2,239,549 | 4/1941 | Chipley . |
| 2,692,025 | 10/1954 | Maxim . |
| 2,940,249 | 6/1960 | Gospodar . |
| 3,070,187 | 12/1962 | Deremer . |
| 3,072,214 | 1/1963 | Deremer . |
| 3,786,890 | 1/1974 | Shank . |
| 3,827,529 | 8/1974 | Frietzsche et al. . |
| 3,949,829 | 4/1976 | Honda et al. . |
| 4,197,704 | 4/1980 | Date . |
| 4,327,811 | 5/1982 | Isaka . |
| 4,359,865 | 11/1982 | Nakao . |
| 4,800,720 | 1/1989 | Okada .................................. 60/313 |
| 4,813,232 | 3/1989 | Hitomi .................................. 60/313 |

FOREIGN PATENT DOCUMENTS

| | | |
|---|---|---|
| 660258 | 4/1938 | Fed. Rep. of Germany ...... 181/273 |
| 2101079 | 8/1972 | Fed. Rep. of Germany ........ 60/313 |
| 860897 | 10/1940 | France . |
| 1138528 | 2/1985 | U.S.S.R. ................................ 60/312 |
| 242314 | 12/1927 | United Kingdom ................ 181/274 |

Primary Examiner—Douglas Hart
Attorney, Agent, or Firm—Litman, McMahon & Brown

[57] ABSTRACT

An exhaust system is provided for internal combustion engines which relatively improves the performance and reduces noise output of such engines. The system comprises a plurality of exhaust pipes which are operably flow connected to exhaust ports of the engine at one end thereof and to discharge pipes through a collection chamber at an opposite end thereof. The discharge pipes include a silencing device in the discharge ends thereof. A feedback mechanism is provided to divert a slip portion of the sonic wavefront and/or mass exiting through an exhaust pipe back toward the exhaust port associated with an interconnected exhaust port or in such a manner as to delay passage of the slip portion out of the discharge pipes or to delay the slip portion and direct same to a different discharge pipe for discharge. The feedback mechanism may be valve and computer controlled so as to add or delete the feedback as required to maximize operation of the engine and/or assist in operation of a vehicle powered by the engine.

11 Claims, 5 Drawing Sheets

EXHAUST SYSTEM

CROSS-REFERENCE TO RELATED APPLICATIONS

The present application is a continuation-in-part of application Ser. No. 107,870, filed Oct. 8, 1987, now U.S. Pat. No. 4,800,719, issued on Jan. 31, 1989; which was a continuation of application Ser. No. 769,995, filed Aug. 26, 1985, and now abandoned; which was a continuation of application Ser. No. 461,863, filed Jan. 28, 1983, and now abandoned.

BACKGROUND OF THE INVENTION

The present invention relates to exhaust systems, in particular to an exhaust system wherein scavenging occurs, especially in combination with feedback and silencing.

In internal combustion engines it is quite common for two or more of the exhaust valves of various cylinders to be open at the same time. Normally, the exhaust gas pressure in the cylinders with exhaust valves open at the same time will not be the same. For example, for one cylinder the exhaust port may have just opened and the exhaust gases within the cylinder are at a relatively high pressure, whereas simultaneously the exhaust valve for another cylinder may have been open for some time such that most of the gases within the cylinder have escaped and the valve has started to close. If the gases escaping from these various cylinders are all vented into the same exhaust manifold, it is quite possible, due to poor engineering, that the exhaust gases from the cylinder where the valve has just opened may at least partially repressurize the cylinder where the valve is just about to close with previously combusted exhaust gases thereby substantially decreasing the efficiency of the engine.

Over the years various exhaust configurations have been designed in attempts to alleviate the above mentioned problem and thereby increase the efficiency of the engine. For instance, exhaust gases from cylinders which would have exhaust valves open at the same time were vented into separate exhaust manifolds. However, higher efficiency has been obtained when, through proper design, the exhaust gases escaping at high pressure from one cylinder are utilized to draw exhaust gases from a cylinder at relatively low pressure before the exhaust valve of the latter closed. This operation and related operations are generally referred to as "scavenging".

In theory, the performance (as used herein—the relative horsepower at any given rate of revolution of the engine) can be improved by decreasing the amount of combusted exhaust gases remaining in a cylinder prior to intake of fresh fuel. Also, in theory, performance can be improved if the fresh fuel (often in a relatively rarified state when entering the cylinder) can be compressed to put more fuel air mixture into the cylinder, as is generally the reason for adding a supercharger to an engine. It is desirable that the fuel-air mixture which is combusted in each succeeding fuel-air burn in a cylinder contain a minimal amount of the burnt fuel-air mixture of the preceeding combustion and as much of the fresh fuel as possible (as long as the fresh fuel remains gaseous). When it is not possible to have only a given fuel-air mixture in the cylinder, it is preferred that fresh ambient air be included therewith, rather than exhausted gases from a previous combustion. Therefore, one of the functions of the present invention is to reduce the amount of residual combusted gases in a cylinder for the succeeding burn as much as possible, while increasing the quality of fresh fuel in the cylinder (as measured by weight rather than volume).

Many types of engines, especially high performance racing and aviation engines tend to have a particular power output associated therewith that tends to peak at a particular engine speed (RPM) and falls off substantially on either side of such a peak (or sometimes peaks). This would not present a problem if these engines only operated at one speed; however, almost all race or aviation vehicles must operate over a wide range of speeds (or altitudes) and, hence, it is preferred that the engine be able to operate efficiently over a wide range of power outputs and vehicle speeds without constantly changing gears to maintain a constant engine output. Therefore, it is desirable to provide a more uniform power output at different engine speeds. This is especially true of engines that have a peak power band at a relatively high speed. Such engines must be kept at this high speed at all times in order to make best use of the peak power by switching gears which becomes very cumbersome to the driver and the high speed tends to wear heavily on the engine causing the engine to wear out over a relatively short period of time.

The peak power band of an engine normally appears to be related to characteristics of the engine and the exhaust system thereof. Normally, the increase of cylinders exhausting into an exhaust header has the effect (if the header is properly designed) of decreasing the engine speed (RPM) at which peak power occurs and/or tends to make the power output more equal over a wider range of engine speeds. Theories have been suggested as to why this occurs; however, the theory is less important to the present invention than the fact that it does occur.

Applicant has theorized that a feedback mechanism utilizing a slip stream of the sonic or mass wavefront of the exhausting gas (emissions) from a first exhaust pipe may be redirected to or up a second pipe toward the engine. In theory, under proper sizing (length of pipe, pipe cross-section, location of intersections, etc.) for a particular engine, the emission wavefront passes along or up the second pipe that is associated with a cylinder that has been over scavenged (that is, fresh fuel has been drawn through an associated exhaust port into the second exhaust pipe) and compresses the fresh fuel back into the cylinder just prior to the exhaust port valve closing so as to effectively supercharge the fresh gas into the cylinder. Where the wavefront is sonic, there is, in effect, a sonic supercharging of the fuel.

It is also desirable to be able to artificially increase the number of discharges through a particular discharge pipe to emulate a system wherein additional exhaust pipes are joined together.

It is also important in exhaust systems of this type to limit the amount of noise produced by the escape of gases from the end of the exhaust system into the ambient atmosphere. Various types of silencing devices have been developed over the years which use different techniques to deaden the noise escaping from the exhaust system utilizing same.

OBJECTS OF THE INVENTION

Therefore the objects of the present invention are as follows: to provide an exhaust system for an internal combustion engine which improves the performance of the engine over conventional exhaust systems; to provide such a system which is highly effective in scavenging exhaust gases from cylinders of the engine; to provide such a system which decreases the relative amount of exhaust gases and increases the relative amount of fuel to fresh air in a mixture within such a cylinder prior to combustion; to provide such a system that lowers the speed (RPM) of the engine at which peak power output (or multiple peak power outputs) occurs and/or more evenly levels the power output over a wide range of speeds; to provide such a system that utilizes a feedback mechanism; to provide such a feedback mechanism that can be selectively used to produce feedback or turned off at the command of an operator or a control computer; to provide such a system which includes a silencer device; to provide such a system which is relatively simple and easily reparable; to provide such a system which is relatively inexpensive to manufacture, easy to install, and particularly well adapted for the intended usage thereof.

Other objects and advantages of this invention will become apparent from the following description taken in conjunction with the accompanying drawings wherein are set forth, by way of illustration and example, certain embodiments of this invention.

SUMMARY OF THE INVENTION

An exhaust system is provided for an internal combustion engine, especially a high performance motorcycle engine or the like. The exhaust system comprises a plurality of exhaust tubes or pipes each of which is connected at one end to an exhaust port of the engine. As used herein the term "exhaust pipe" refers to the part of the exhaust system nearest the engine. A second end of each exhaust pipe is connected to a collector chamber defined by structure means comprising suitable surrounding walls. Further, a discharge pipe is connected at one end thereof to the collector chamber and discharges at a second end thereof into the ambient atmosphere. Flow communication means, preferably a second discharge pipe provides for flow of gas between the chamber and the atmosphere. As used herein, the term "discharge pipe" refers to that part of the exhaust system prior to where the gas passes into the ambient atmosphere.

Preferably, each of the exhaust pipes is of substantially equal length. Also the exhaust pipes are connected to a first end of the collector chamber and the discharge pipes are connected to a second end of the collector chamber opposite the first end thereof. Further, the exhaust pipes are arranged in sets of one or more. The term "generally aligned" as used herein does not mean exactly aligned but rather aligned so that the momentum of gases flowing through one exhaust pipe generally directs the majority of the mass of the gases into the associated discharge pipe.

The discharge pipes not only open into the ambient atmosphere and, therefore, allow a gas stream to diverge substantially at that point, but also may diverge along the length thereof. In this manner, a venturi-like configuration is formed within the system.

A particularly effective configuration of the exhaust system has been employed with a four cylinder motorcycle engine, although it is foreseen that engines having two, three, six or other numbers of cylinders may utilize the same principles.

A silencer mechanism is also provided for each of the discharge pipes. The silencer mechanism in one embodiment comprises a set of spaced grooves in the free or distal end of each discharge pipe near the end thereof with the slots cut along the circumference of the pipe and with the axial end of the pipe blocked. In a second embodiment, the emissions within the exhaust system caused to intersect with each other and with themselves at related intervals so as to smooth the positive and negative pressure region, thereby reducing the sound created on discharge of the emissions into the atmosphere.

The drawings constitute a part of this specification and include exemplary embodiments of the present invention and illustrate various objects and features thereof.

DETAILED DESCRIPTION OF AN EMBODIMENT OF THE INVENTION

Figure 1:
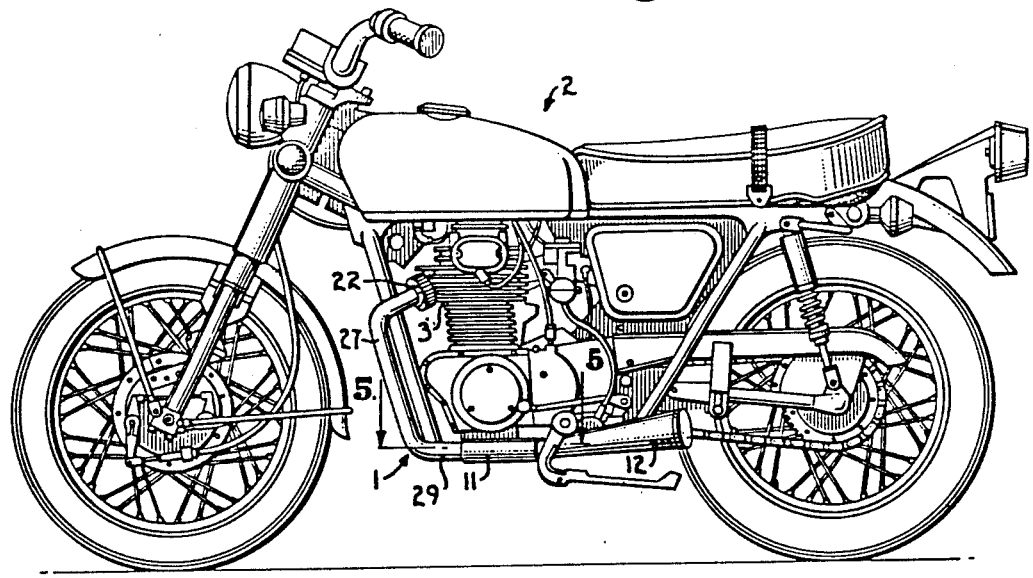
FIG. 1 is a side elevational view of a motorcycle having an internal combustion engine and an exhaust system according to the present invention.
Figure 2:
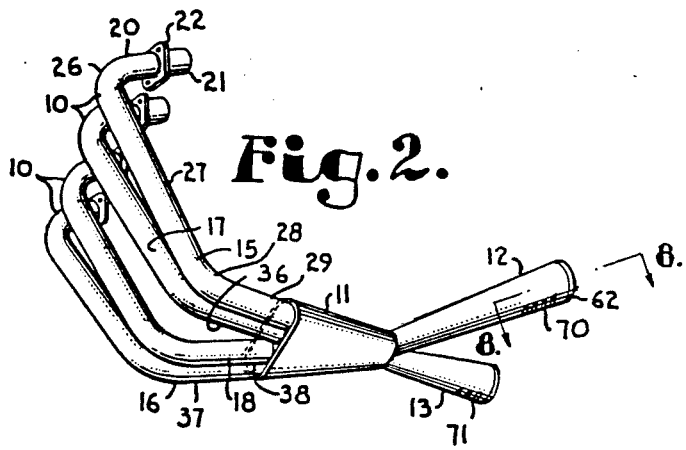
FIG. 2 is an enlarged perspective view of the exhaust system showing exhaust pipes, a collector, and discharge pipes, showing internal portions of a silencer in phantom.
Figure 3:
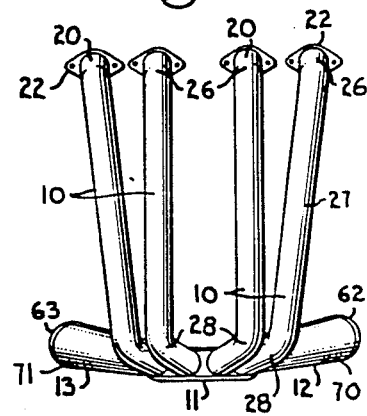
FIG. 3 is an enlarged front end view of the exhaust system.
Figure 4:
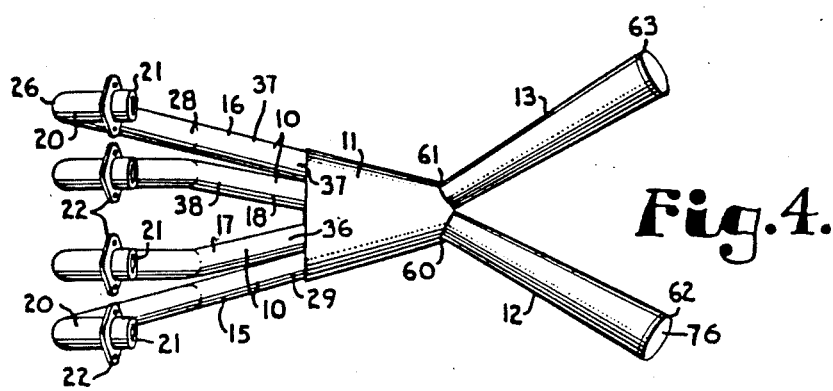
FIG. 4 is an enlarged top plan view of the exhaust system.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an exhaust system mounted on a motorcycle 2 having an internal combustion engine 3. The exhaust system 1 comprises a plurality of exhaust pipes generally designated by the reference numeral 10, a cross-flow collector 11, a first discharge pipe 12 and a second discharge pipe 13.

In the embodiment shown, there are four exhaust pipes 10 in particular two outer exhaust pipes 15 and 16 and two inner exhaust pipes 17 and 18. Each of the exhaust pipes 10 have a similar configuration and are of substantially the same length. As an example, outer exhaust pipe 15 has an upper neck 20 having an end 21 associated therewith which opens to the interior of the pipe 15. A manifold clamp 22 surrounds and is secured by welding or the like to the neck 20 and secures the exhaust pipe 15 to the engine 3 with suitable bolts or the like passed through the clamp 22. The end 21 is received by the exhaust port of the engine 3. The interior of the exhaust pipe 15 communicates with a single exhaust port (not shown) on the engine 3 in a manner well known in the art. Continuing along the exhaust pipe 15 after the neck 20 is a bend 26 followed by a drop section 27 another bend 28 which thereafter directs the exhaust gases therein both rearwardly and generally horizontally. Following the bend 28 is a convergent section 29 which is interiorly flow-connected to a port 35 in the collector 11. The exhaust pipe 17 has a convergent section 36 which is aligned generally parallel to convergent section 29 of exhaust pipe 15. Exhaust pipes 16 and 18 also have convergent sections 37 and 38 respectfully which are aligned generally parallel to one another but at somewhat acute angles to sections 29 and 36. Each of the sections 29, 36, 37 and 38 are also slightly angled with respect to a longitudinal axis of the collector 11, each diverging at about the same angle from the axis but with sections 37 and 38 on opposite sides of the axis from section 29 and 36.

Figure 5:
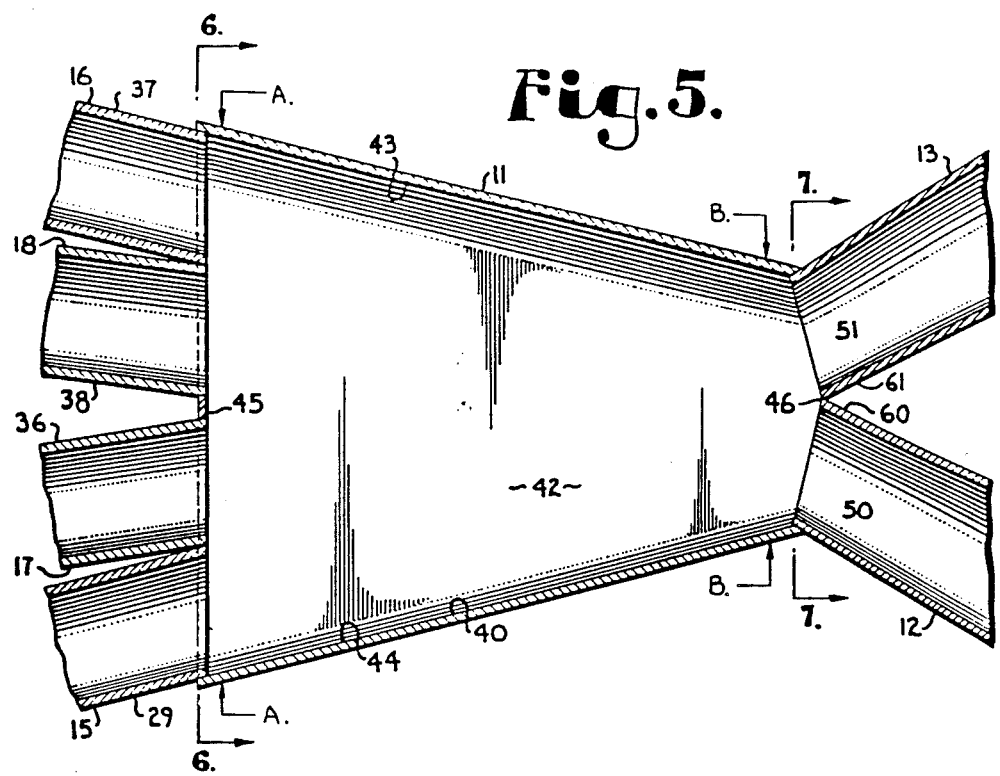
FIG. 5 is a further enlarged and partial cross-sectional view of the exhaust system, especially detailing the collector, taken along line 5—5 of FIG. 1.
Figure 6:
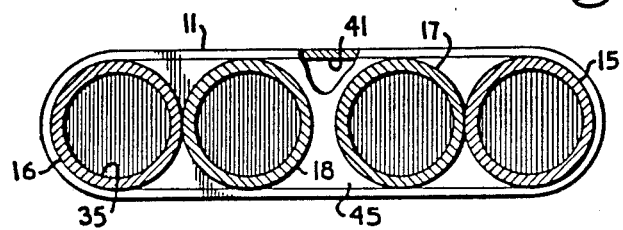
FIG. 6 is an enlarged cross-sectional view of the exhaust system taken along line 6—6 of FIG. 5, with portions broken away to show interior detail thereof.
Figure 7:
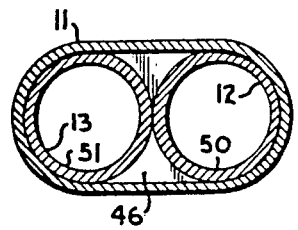
FIG. 7 is an enlarged cross-sectional view of the exhaust system taken along line 7—7 of FIG. 5.

The collector 11 defines an interior chamber 40, as seen in FIG. 5. The chamber 40 includes a top wall 41, bottom wall 42, sidewalls 43 and 44 and a front end wall 45 and a rear end wall 46. The chamber rear end wall 45 has apertures, such as collector port 35, for each of the exhaust tubes 15, 16, 17 and 18 passing therethrough. The lateral cross-sectional area of the chamber 40 near the exhaust pipes 15, 16, 17 and 18, as indicated by the letter A in FIG. 5 is substantially greater than the cross-sectional area of any one of the exhaust pipes and also the lateral cross-sectional area of the chamber 40 near an opposite end thereof associated with the discharge pipes 12 and 13 and indicated by the letter B in FIG. 5. The chamber upper wall 41 and lower wall 42 are generally trapezoidal-shaped having their bases secured to the front end wall 45. The chamber side walls 43 and 44 generally converge toward one another and toward the central axis of the collector 11 from the front end wall 45 to the rear end wall 46 while maintaining a relatively constant height therealong.

The illustrated chamber 40 has no internal baffles or other substantial internal restrictions. The chamber 40 top wall 41 and bottom wall 42 smoothly and sealably are joined with the side walls 43 and 44 of opposite sides thereof in a rounded and streamlined manner. The chamber rear end wall 46 includes ports 50 and 51 therethrough which respectfully flow communicate with interiors of the discharge pipes 12 and 13.

The discharge pipes 12 and 13 are connected at a first end 60 and 61 respectively thereof and each have a second end 62 and 63 respectively which opens into the ambient air. The discharge pipes 12 and 13 flair or diverge outwardly from each other from the collector 11 and are generally symmetrically positioned about the central axis passing longitudinally through the collector 11. The discharge pipe 12 has an axis which is generally coaxial with the axes of exhaust pipes 16 and 18. It is noted that these axes cannot be exactly coaxial since there are two exhaust pipes which cannot be overlapped, however, the axes are generally made as coaxial as possible. Likewise, the discharge pipe 13 is generally coaxial with the exhaust pipes 15 and 17. In addition, the axes of the discharge pipes 12 and 13 cross in a generally planar fashion within the collector chamber 40. The discharge pipes 12 and 13 each diverge outwardly from their first ends 60 and 61 to their second ends 62 and 63, respectively. It has been found that when the angle of divergence with respect to the axis of each discharge tube is approxiamtely 3° a satisfactory ratio of the diameter of the first end 60 and 61 to the second ends 62 and 63 respectfully is in the nature of about 1.5 to 2.5.

Figure 8:
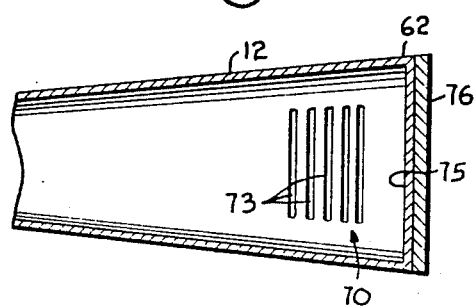
FIG. 8 is a partial and enlarged side elevational view of a distal end of one of the discharge pipes, with portions removed to show interior detail thereof.

Each of the discharge pipes 12 and 13 includes a silencer 70 and 71, respectfully. The silencers 70 and 71 are essentially identical and detail of silencer 70 is shown in FIG. 8. The silencer 70 comprises a plurality of grooves 73 along the pipe 12 near the end thereof. The grooves 73 are circumferentially cut in the side of the pipe 12 in closely spaced and parallel relationship to one another. The grooves 73 are closely spaced from the end of the pipe 12. Preferably, the grooves have a cross-sectional area in total at least as great as the cross-sectional area of the pipe 12 at the first end 60 thereof.

The second end 62 is closed with an end cap 75. Mounted on the end cap 75 is a hard rubber element positioned to dampen sound emitted by the end cap 75 so as to prevent the end cap 75 from vibrating like a drum under the impact of emissions and transfering such vibrations to the air. Alternatively, the element 76 may be a metal that does not have a vibrating frequency near that of the emissions or a similar material. Preferably, the slots 73 are elongate and relatively as narrow as possible and closely spaced as possible. The narrowness of the slots 73 is believed to especially reduce noise produced by the escaping emissions.

In use, when the motorcycle engine 3 is operating, pulses of gas at relatively high temperature and pressure are discharged from the engine into the exhaust pipes 12 and 13. The gas pulses traverse the interior of the exhaust pipes 10 and pass into the collector chamber 40 and thereafter pass into and through the discharge pipes 12 and 13 to the atmosphere surrounding the motorcycle 2. When the system 1 is installed on a motorcycle 2, only the discharge ends 62 and 63 of the discharge pipes 12 and 13 are open to the ambient air with the rest of the interior of the system 1 being sealably flow interconnected. It is noted that, in each of the following embodiments, only the discharge ends of the discharge pipes are open to the ambient air except the embodiment in FIG. 13 where the discharge pipes discharge into a header which is open to the air.

Figure 9:
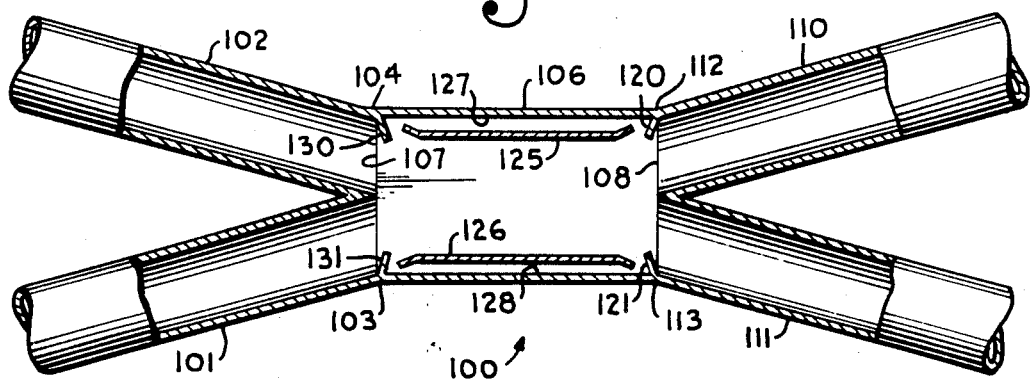
FIG. 9 is a fragmentary top plan view of a first modified exhaust system in accordance with the present invention, with portions thereof broken away to show interior detail.

Shown in FIG. 9 is a first modified embodiment of an exhaust system generally indicated by the reference numeral 100. The exhaust system 100 includes a pair of converging exhaust pipes 101 and 102 which are connected to an engine similar to the exhaust pipes 17 and 18 of the previous embodiment at unshown ends thereof and joined commonly together at opposite ends thereof 103 and 104 to allow flow of gases therebetween. The exhaust pipes 101 and 102 generally intersect at an angle with respect to one another at the ends 103 and 104.

Flow connected with the exhaust pipe ends 103 and 104 is a chamber or collector 106. The collector 106 is generally a hollow tube allowing the flow of gases from the exhaust pipes 101 and 102 to enter one end 107 thereof and to exit an opposite end 108 thereof. Flow connected to the opposite end 108 is a pair of diverging discharge pipes 110 and 111 connecting at ends 112 and 113 to the collector 106. Opposite ends of the discharge pipes 110 and 111 open to the ambient atmosphere in a manner similar to the previous embodiment.

In the present embodiment, the exhaust pipe 102 and the discharge pipe 111 are generally axially aligned and the exhaust pipe 101 and discharge pipe 110 are also generally aligned. Positioned in the collector 106 on opposite sides thereof are a pair of baffles or projections 120 and 121. The projection 120 is positioned in the collector such that matter and/or sonic emissions from the exhaust pipe 101 partially impinge upon the projection 120 while a majority of the emission from the exhaust pipe 101 passes on through into the discharge pipe 110.

Likewise, the projection 121 engages a slip stream of the emissions from the exhaust pipe 102 as such emissions pass through the collector 106 to the exhaust header 111. A pair of open ended internal walls 125 and 126 are also located on opposite sides of the collector 106. The walls 125 and 126 form ducts or channels along the sides of the collector 106. The ends of the walls 125 and 126 are slightly flared toward the sides of the collector 106.

The channels 127 and 128 are positioned to receive flow of emissions which reflect off the projections 120 and 121 respectively and channel these reflected emissions along the sides of the collector 106 back toward the exhaust pipes 101 and 102.

Near the end 107 of the collector 106 is a second set of projections 130 and 131 positioned to be aligned with the ends of the channels 127 and 128 opposite the projections 120 and 121 respectively. The projections 130 and 131 reflect the emissions that have passed through the channels back toward the discharge pipes 110 and 111 and, especially, toward the discharge pipe opposite the projection 130 or 131.

During use, a majority of the gas stream passes directly from the exhaust pipes 101 and 102 to the discharge pipes 110 and 111. During each emission from one of the exhaust pipes 101 and 102, there is a slipstream of the emission that impinges upon the projection 120 or 121 located opposite the respective exhaust pipe 101 and 102 such that the impinging emission reflects into and through the respective channels 127 and 128 and further impinges upon the projections 130 and 131 respectively to be diverted back toward the opposite discharge pipe 110 and 111.

Figure 10:
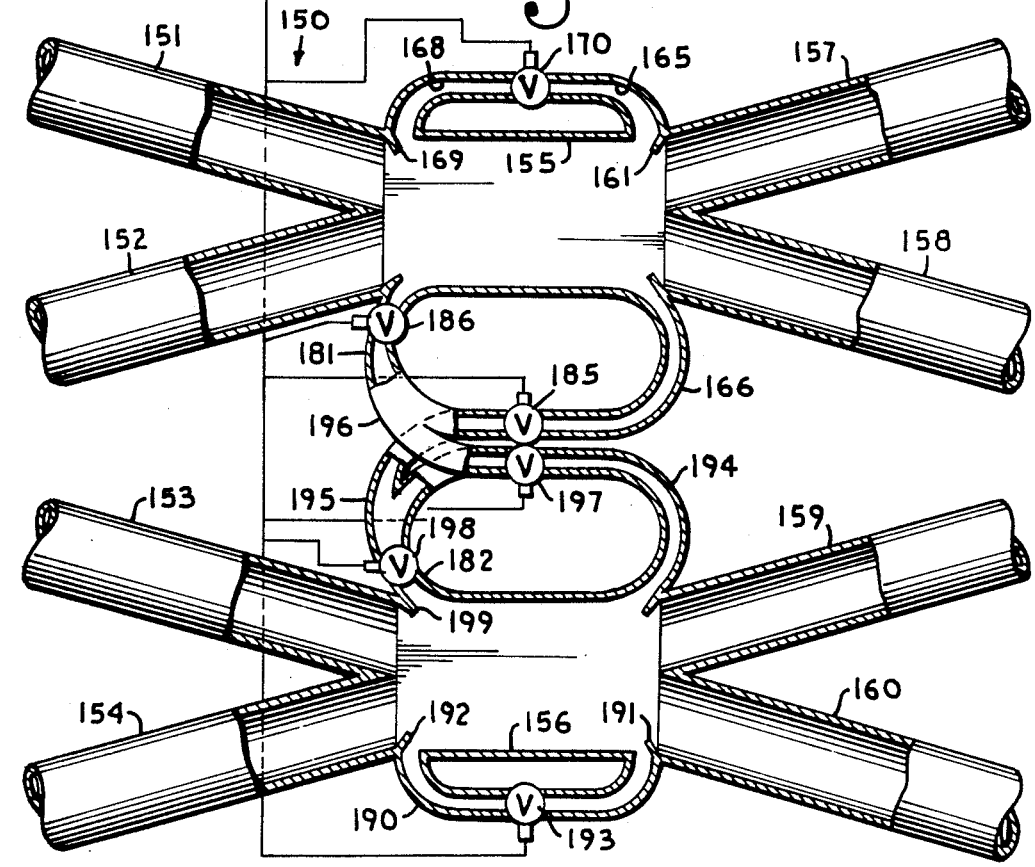
FIG. 10 is a fragmentary top plan view of a second modified exhaust system in accordance with the present invention, with portions thereof broken away to show interior detail.

Illustrated in FIG. 10 is a second modified embodiment of the exhaust system in accordance with the present invention. The exhaust system 150 comprises four paired exhaust pipes 151, 152, 153 and 154; a pair of collectors 155 and 156; and four paired discharge pipes 157, 158, 159 and 160. The exhaust pipes 151 and 152 angularly join together at one end thereof and flow connect with one end of the collector 155 such that the emissions from the pipes 151 and 152 flow into and through the collector 155. Opposite ends of the pipes 151 and 152 are connected to exhaust ports on an internal combustion engine (not shown).

The collector 155 is generally a cylindrical tube having open opposite ends to receive and discharge emissions. The discharge pipes 157 and 158 are connected to the collector 155 opposite the exhaust pipes 151 and 152 so as to generally form an X-shaped configuration between the pipes 151, 152, 157 and 158. The discharge pipes 157 and 158 open on an opposite end thereof relative to the collector 155 to the atmosphere.

Positioned in the collector 155 so as to intersect with emission flow from the pipes 151 and 152 are a pair of projections 161 and 162. The projections 161 and 162 extend partially across the opening in the end of the collector 155 for the pipes 157 and 158 respectively, but in a manner so as to not impede the majority of flow of emissions into the pipes 157 and 158.

Tubes 165 and 166 are flow connected with the collector 155 and are attached to opposite sides thereof. The tube 165 has an internal channel 168 which opens into the collector 155 at the projection 151 near the discharge pipe 157 and discharges back into the collector 155 near the exhaust pipe 151. A projection 169 extends outwardly from the wall of the collector 155 at the discharge of the tube 168 into the collector 155. A flow control valve 170 which is of a solenoid controlled flapper valve type (although it is foreseen that other types of mechanically or electrically operated valves will work satisfactorily) is positioned intermittently along the tube 165, such that when the valve 170 is open, emissions from the exhaust pipe 152 partially impinge upon the projection 161 and flow into the tube 165 through the valve 170 and out the discharge of the tube 165 in front of the projection 169 whereupon the emissions then impinge upon the projection 169 and are reflected back toward the discharge pipes, especially pipe 158.

The second tube 166 is flow connected at one end thereof to the interior of the collector 155 near the projection 162 and diverges into two sections 181 and 182. The section 181 rejoins with the collector 155 near the exhaust pipe 152. A projection 183 is located at the juncture of the tube section 181 with the collector 155. A valve 185 is located along the tube 166 before splitting into the two sections 181 and 182 and a second valve 186 is located along the section 181. The valves 185 and 186 are preferably of a flapper valve type that are solenoid controlled.

A second set of corresponding tubes is associated with the collector 156. In particular, a third tube 190 extends along one side of the collector 156 from one end thereof to the other and, in particular, from near a projection 191 to near a projection 192 located near opposite ends of the collector. A valve 193 controls flow along the tube 190.

A fourth tube 194 is connected to the opposite ends of the collector 156 on the opposite side the collector 156 from the tube 190. The tube 194 also bifurcates into a pair of tube sections 195 and 196. The tube section 196 joins with the tube section 181 and the tube section 195 joins with the tube section 182. A valve 197 controls flow in the tube 194 prior to divergence thereof and a second valve 198 controls flow through the tube section 182.

The tube section 182 opens into the collector 186 near a projection 199. The valves 170, 186, 185, 197, 198 and 193 are all preferably of a type that can be controlled by a solenoid or the like to allow computer control thereof. In particular, the valves of the present embodiment are connected to a computer which is also provided with inputs for providing atmospheric pressure, engine revolutions per minute and the like so as to optimize control of the feedback in accordance with the present embodiment. In this manner, the valves are opened and closed to allow flow of a partial slipstream of emissions be conveyed from one end to the opposite end of the collectors 155 and 156 so as to provide additional impulses to either pass through the opposed discharge pipes as compared to the major flow of emissions from a single combustion or to return back up the exhaust pipes in order to provide for better operation of the engine over a wider range of speeds.

When this system is used with aircraft engines, it is foreseen that the increased torque provided by the exhaust system 150 at lower altitudes may overstress the airframe and, therefore, may be set to only be used with feedback at upper altitudes where power normally decreases. It is also foreseen that the pilot may be provided with override means, such as a switch, to turn on the feedback at lower altitudes during an emergency requiring additional power.

With respect to the apparatus shown in FIG. 10, it is foreseen that feedback could be provided by use of a microphone and sound generating system wherein the various feedback tubes, for example tube 165, would include sound sensors which would be linked to a computer to sense the passage of a wave front through the tube 165 and transmit a signal to a sound generating means located in a different one of the feedback tubes, such as 190, wherein it would generate a feedback pulse. It is also foreseen that other types of pulses, such as fuel intake pulses, could be utilized to trigger a feedback pulse by interfacing with the exhaust gases through a diaphragm. Finally, it is also foreseen that different numbers of exhaust pipes could be interconnected in the manner shown in FIG. 10, both from the same engine or from different engines that are synchronized to run together.

Figure 11:
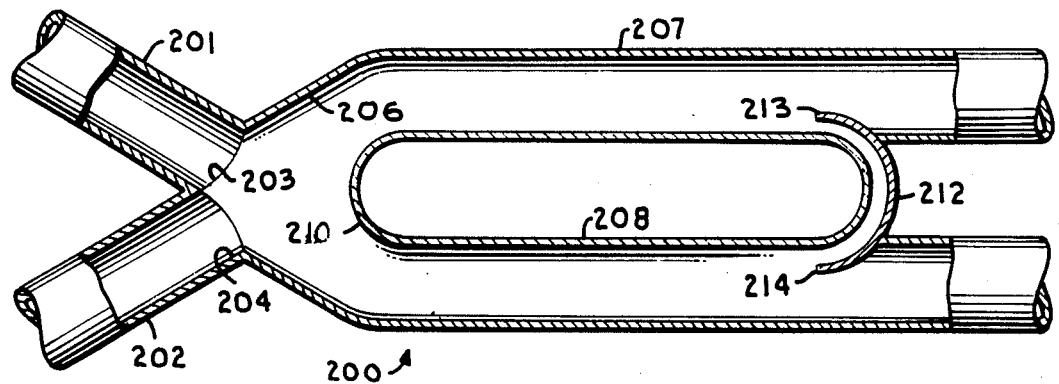
FIG. 11 is a fragmentary top plan view of a third modified exhaust system in accordance with the present invention, with portions thereof broken away to show interior detail.

FIG. 11 shows a third modified embodiment of an exhaust system in accordance with the present invention generally designated by the reference numeral 200. In the exhaust system 200, a pair of exhaust pipes 201 and 202 are connected to outlet ports of an engine (not shown) at one end thereof and are connected together so as to flow communicate with one another at the opposite ends thereof 203 and 204 respectively. The pipes 201 and 202 also flow connect with a chamber 206 which, in turn, connects with two discharge pipes 207 and 208. The exhaust pipes 201 and 202 converge and connect at an angle with respect to one another, whereas the exhaust pipes 207 and 208 are axially aligned to be generally parallel to one another.

The chamber 206 includes a wall 210 opposite the discharge of the pipes 201 and 202 thereinto. The wall 210 reflects a minor portion of the emissions from the exhaust pipes 201 and 202 which otherwise substantially flow into the discharge pipes 208 and 207 respectively.

At a spaced location from the chamber 206 along the discharge pipes 207 and 208 is a feedback tube 212. The feedback tube 212 has first and second ends 213 and 214. The tube first end 213 projects into the discharge pipe 207 and opens in a manner generally facing the chamber 206 so that normal flow out of the discharge pipe 207 partially impinges on and is conveyed into the tube 212 at the end 213. The end 214 has a similar opening in the discharge pipe 208 so as to deflect a minor portion of the flow through the discharge pipe 208 through the tube 212 and out the end 213 thereof into the discharge pipe 207 in a direction headed back toward the chamber 206. The discharge pipes 207 and 208 have ends opposite the chamber 206 for discharge to the atmosphere.

The exhaust system 200 provides multiple locations of feedback in that feedback is provided both by reflection from the wall 210 and by transfer of emissions through the tube 212 to return in the opposite direction and in the opposite discharge pipe as compared to its original direction of travel. It is foreseen that multiple feedback loops such as the tube 212 could be utilized in conjunction with two or more discharge pipes at various locations therealong so as to provide additional multiple feedback pulses.

Preferably, the distance of the wall 210 from the outlet ports of the engine as well as the positioning of the tube 212 with respect to emission travel distance, are such as to maximize the effect of the feedback for a particular engine. This distance varies with different engines.

Figure 12:
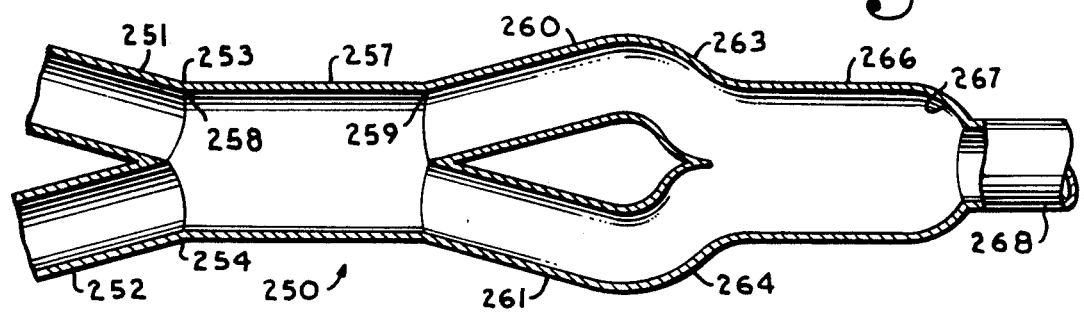
FIG. 12 is a fragmentary top plan view of a fourth modified exhaust system in accordance with the present invention, with portions thereof broken away to show interior detail.

Illustrated in FIG. 12 is a fourth exhaust system in accordance with the present invention generally designated by the reference 250. The exhaust system 250 includes a pair of exhaust pipes 251 and 252 which are joined at one end thereof to outlet ports of an engine (not shown) and angularly flow joined together at opposite ends 253 and 254 respectively. The exhaust pipe ends 253 and 254 sealably and flowably connect with a director chamber 257 which is generally in the shape of an open ended cylinder.

The pipes 251 and 252 connect to a first end 258 of the collector 257 and a collector second end 259 flowably connects with a pair of diverging pipes 260 and 261. The diverging pipes 260 and 261 are generally axially aligned with the pipes 251 and 252 respectively so that flow from the pipe 251 mostly passes into the pipe 261 and flow from the pipe 252 mostly passes into the pipe 260 during use. The diverging pipes 260 and 261 respectively join with S-shaped pipes 263 and 264. The S-shaped pipes 263 and 264 converge in a parallel path and are flowably joined to a larger diameter junction pipe 266.

The junction pipe 266 is reduced in diameter at a wall 267 and axially joins with a discharge pipe 268. The discharge pipe 268, the S pipes 263 and 264, the diverging pipes 260 and 261, and the exhaust pipes 251 and 252 all have approximately the same diameter. Emisions flowing through the pipes 251 and 252 are directed through the chamber 257 into the diverging pipes 260 and 261 respectively. The emissions then pass into the junction pipe 266 and a partial amount of the emissions are reflected off of the wall 267 back in the opposite direction while a majority remainder of the emissions pass through the discharge pipe 268 into the atmosphere. The system is generally sealed to the atmosphere except for the inlets at the ends of the pipes 251 and 252 and for the outlet at the end of pipe 268.

The exhaust system 250 provides feedback when the emissions strike the wall 267. In addition, the system 250 provides some muffling as it is believed that the reonvergence of the S pipes 263 and 264 into the single junction pipe 266 somewhat accoustically decouples the noise pulses present in the chamber 257 from the discharge so as to provide muffling. Finally, the system 250 allows for a single convenient outlet or discharge pipe 268 from multiple exhaust pipes 251 and 252.

Figure 13:
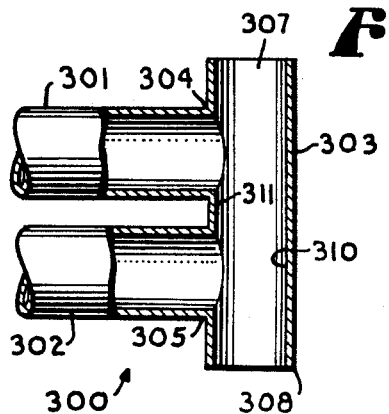
FIG. 13 is a top plan view of a fifth modified exhaust system in accordance with the present invention, with portions thereof broken away to show detail.

Shown in FIG. 13 is a fifth modified embodiment of the present invention showing a partial exhaust system generally represented by the reference numeral 300. The system 300 includes two discharge pipes 301 and 302 that join in a common header 303 at ends 304 and 305 respectively. The pipes 301 and 302 as illustrated are parallel (although it is foreseen that the pipes do not have to be parallel in accordance with the invention) and join at substantially right angles with the header 303. The header 303 is a tube which is generally of the same diameter as the pipes 301 and 302 having open ends 307 and 308.

The emissions from the pipes 301 and 302 enter the header 303 and are mostly conveyed out of one or both of the openings 307 or 308. A portion of the emissions from the discharge pipes 301 and 302 strike an opposing wall 310 of the header 303 and are reflected back up the opposing discharge pipe. A tubular wall 311 also separates the discharge pipes 301 and 302 from one another. Although the discharge in the present embodiment is shown as being through the openings 307 and 308, it is foreseen that openings could also be provided in the wall 310 or in the wall 311 which would function alternatively or in conjunction with the openings 307 and 308 to allow release of the emissions into the atmosphere. Further, it is foreseen that only one open end either 307 or 308 could be provided. The system 300 may be used independently or in conjunction with other exhaust systems. For example, the system 300 could be joined with the system 1 by replacing the pipes 12 and 13 with the pipes 301 and 302 connected to the header 303.

Figure 14:
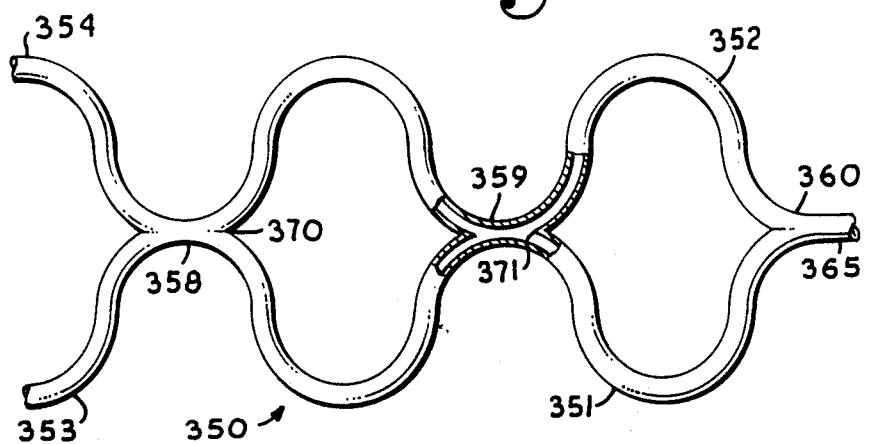
FIG. 14 is a fragmentary top plan view of a sixth modified embodiment of an exhaust system in accordance with the present invention with portions broken away to show interior detail.

Shown in FIG. 14 is a sixth modified embodiment of the present invention showing an exhaust system 350. The exhaust system 350 includes a pair of serpentine or sinusoidal exhaust pipes 351 and 352 which are joined near ends 353 and 354 to exhaust ports of an engine (not shown). The pipes 351 and 352 are generally mirror images of one another and of substantially equal diameter. The tubes 351 and 352 are joined together at intersections 358, 359 and 360. At the intersections 358, 359 and 360, the pipes 351 and 352 are flow connected with one another such that emission flow can pass from one to the other. The pipes 351 and 352 where they join at the intersection 360 are connected to a single discharge pipe 365 which discharges into the atmosphere. It is foreseen that the discharge pipe could also diverge into two arms in the manner and curvature of the pipes 351 and 352 to allow for multiple exhaust.

In the system 350, partial emissions are reflected back along the path of the pipes 353 and 354 when the emissions engage the ends 370 and 371 of the intersections 358 and 359. It is foreseen that any number of combinations of intersections such as 358 could be utilized along the length of two or more exhaust pipes of the type shown so as to interconnect them together and provide multiple feedback. Further advantages are gained from the system in that the multiple intersection of the emissions flowing along the pipes 351 and 352 provide for some nullification of positive and negative pulses along the pipes so as to reduce the noise level at the discharge of the pipe 365, thereby partially silencing the noise level without adding restrictions to the flow path of the emissions.

Figure 15:
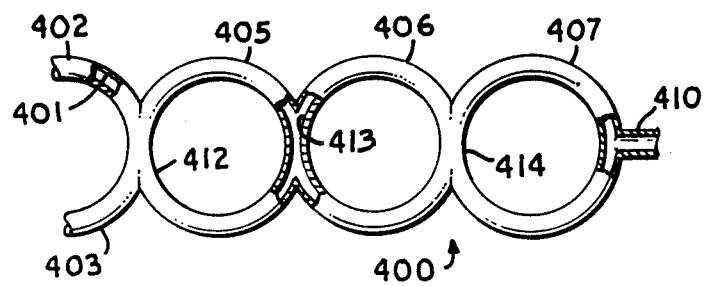
FIG. 15 is a fragmentary top plan view of a seventh modified embodiment of an exhaust system in accordance with the present invention with portions broken away to show interior detail.

FIG. 15 is a seventh modified embodiment of the present invention generally represented by the reference numeral 400. The exhaust system 400 includes a discharge pipe 401 having ends 402 and 403 which are positioned near locations whereat the discharge pipe 401 connects with outlet ports of an engine (not shown). The interior of the discharge pipe 401 is flowably connected to the interior of three circular tubular sections 405, 406 and 407. Each of the tubular sections 405, 406 and 407 are flow connected with one another. In particular, section 405 is tangentially joined with pipe 401 and with section 406. Section 407 is tangentially joined with section 406 opposite the juncture thereof with section 405 and on an opposite side with a discharge pipe 410. The pipe 401 joins with the section 405 at a juncture 412; the section 405 joins with the section 406 at a juncture 413 and the section 406 joins with the section 407 at a juncture 414. In this embodiment, the interior of each section tangentially joins with the exterior of the next section. The pipes 401 and the sections 405, 406 and 407 flowably join with one another at the intersections 412, 413 and 414 so as to allow flow of emissions to pass from one to the other or to be partially reflected backwards through the system 400. At each intersection 412, 413, 414 as well as at the juncture of the discharge pipe with the section 404, a portion of the emissions is reflected back toward the exhaust ports while a remainder of the emissions passes through and eventually out of the discharge pipe 410.

It is foreseen that a number of sections such as 405 could be grouped together in the manner shown in the exhaust system 400 and that the discharge pipe 410 could be an arcuate section having the same configuration as the pipe 401.

Figure 16:
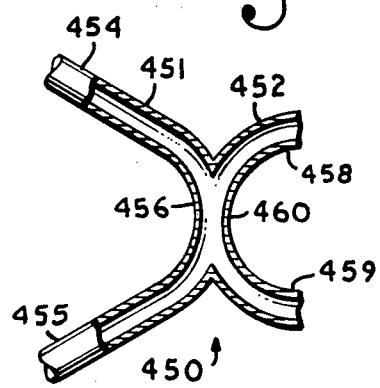
FIG. 16 is a fragmentary top plan view of an eighth modified embodiment of an exhaust system in accordance with the present invention with portions broken away to show interior detail.

FIG. 16 illustrates an eighth modified embodiment of an exhaust system in accordance with the present invention, generally represented by the reference numeral 450. The exhaust system 450 includes an exhaust pipe 451 and a discharge pipe 452. The exhaust pipe 451 has ends 454 and 455 which are joined, when in use, to exhaust discharges of an engine (not shown). The pipe 451 is generally arcuate in configuration and has a generally circular radius near a midpoint 456 thereof. The discharge pipe 452 is a circular tube having opposite ends 458 and 459 which are attached to ends (not shown) which allow discharge into the atmosphere and which can be similar to the ends shown in FIG. 8 of a previous embodiment. The discharge pipe 452 and exhaust pipe 451 join with an inside radius of one being tangent to the outside radius of the other at an intersection 460 which allows free flow of emissions between the pipes 451 and 452.

During use, emissions in the exhaust pipe 451 pass through the intersection 460 and are thereafter mostly conveyed away from the intersection 460 by the pipe 452. For example, emissions from the end 454 of pipe 452 mostly pass into and exit through the end 459 of pipe 452. However, a portion of the emissions is conveyed along the opposite side of the exhaust pipe 451 back toward the engine and a portion may also be reflected back up the same side of the discharge pipe toward the engine.

Figure 17:
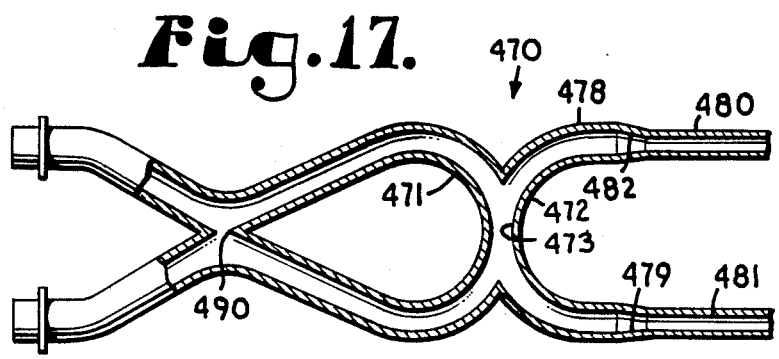
FIG. 17 is a fragmentary top plan view of a ninth modified embodiment of an exhaust system in accordance with the present invention with portions broken away to show interior detail.

Shown in FIG. 17 is a ninth modified embodiment of the present invention, showing an exhaust system generally represented by the reference numeral 470. The system 470 includes circular exhaust pipes 471 and 472 joined at a common intersection 473. The discharge pipe 472 also has opposite ends 478 and 479 which are joined to stub pipes 480 and 481 respectively. The stub pipes 480 and 481 have a reduced diameter as compared to the pipe 472 such that restrictive walls 482 and 483 respectively are formed at their intersections.

The exhaust pipe 471 is also joined at a joining restrictive means such as restrictive orifice 490. The arms of the pipe 471, where connected at the orifice 490, join generally tangentially with the outside surface of each joining tangentially to outside surface of the other in a side by side relationship. In use, feedback is provided both at the intersection 473 and by partial reflection of emissions by the restrictive walls 482 and 483. The orifice 490 allows for gas to transfer between the arms of the pipe 471 such that after an emission passes through one arm, the orifice 470 lets gas enter from the opposite arm to break a vacuum therein. The orifice 470 is preferably sized to be small enough to allow scavanging to occur before the vacuum is broken.

It is foreseen that a connecting restrictive means such as the orifice 470 may be utilized with other embodiments of this application or independently.

Further, it is foreseen that multiple systems 470 can be stacked and the outlets of adjacent systems joined such that pipes 480 and 481 of each system 470 are connected to flow together and to provide feedback between the systems 470.

It is also foreseen that feedback means of the type illustrated herein may be utilized to provide feedback back along the same path just traveled by an emission, or along the same path traveled by the emission but on a delayed basis, or in an outflowing direction (that is, toward the ambient air) in one or more different paths than traveled by a majority of the emission, or along a path not followed by the emission back toward the engine or source of emissions along a different path.

It is to be understood that while certain forms of the present invention have been illustrated and described herein, it is not to be limited to the specific forms or arrangement of parts described and shown.

What is claimed and desired to be secured by Letters Patent is as follows:

1. An exhaust system for an internal combustion engine having at least four exhaust ports and having an exhaust pipe flow connected to each port; said system comprising:
   (a) at least two chambers;
   (b) said exhaust pipes in pairs and each pair being flow connected opposite the end thereof adapted to be connected to said exhaust ports at one of said chambers; and
   (c) a duct flow connecting two of said chambers; said duct including flow directing means for directing a minor portion of a feedback emission flow passing through a first of said chambers such that said minor portion flows into a second of said chambers through said duct.

2. The system according to claim 1 wherein:
   (a) said duct includes a valve for operably and selectively blocking flow through said duct.

3. The system according to claim 2 wherein:
   (a) said duct includes sections flow connected to said first and second chambers to both allow selective flow of said minor portion of emissions from said first chamber to said second chamber and from said second chamber to said first chamber.

4. The system according to claim 3 wherein:
   (a) said duct also includes sections to allow said minor flow to return to the chamber whereat such minor flow originated.

5. The system according to claim 4 including:
   (a) valve and control means for operably adjusting flow through said duct.

6. The system according to claim 5 wherein:
   (a) said control means includes a computer.

7. The system according to claim 6 wherein:
   (a) said engine is an airplane engine;
   (b) said valve and control means controls feedback resulting from flow of emissions through said duct; and
   (c) including override means whereby a pilot may manually control said valve means.

8. An exhaust system for an internal combustion engine having a plurality of exhaust ports; said system comprising:
   (a) a plurality of exhaust pipes; each of said exhaust pipes being adapted to be connected to one of said exhaust ports so as to allow exhaust emission flow to flow from one of the ports into a respective exhaust pipe;
   (b) discharge means for conveying the exhaust emission flow from said exhaust pipes to the atmosphere; the exhaust emission flow generally flowing through the system in a discharge direction toward and out of said discharge means;
   (c) feedback means for diverting a portion of the exhaust emission flow from said discharge direction; and
   (d) said feedback means comprises diversion wall means positioned in said system to divert minor portions of said emission flow passing therethrough.

9. An exhaust system for an internal combustion engine having a plurality of exhaust ports; said system comprising:
   (a) a plurality of exhaust pipes; each of said exhaust pipes being adapted to be connected to one of said exhaust ports so as to allow exhaust emission flow to flow from one of the ports into a respective exhaust pipe;
   (b) discharge means for conveying the exhaust emission flow from said exhaust pipes to the atmosphere; the exhaust emission flow generally flowing through the system in a discharge direction toward and out of said discharge means;
   (c) feedback means for diverting a portion of the exhaust emission flow from said discharge direction; and
   (d) said feedback means comprises at least first and second spaced wall means positioned along said pathway such that each of said wall means diverts a minor portion of each emission flow from the pathway associated with a major portion of the emission flow.

10. The system according to claim 9 wherein:
(a) said first wall means comprises a wall positioned at the discharge of at least one of said exhaust pipes to engage a portion of the emissions exiting therefrom; and including:
(b) a discharge pipe associated with each exhaust pipe; and
(c) said second wall means includes a projection into one of said discharge pipes at a location spaced from said first wall means and including a duct associated with said projection and flow connected to a second of said discharge pipes such that emissions engaging said projection are urged into and through said duct to said second discharge pipe.

11. An exhaust system for an internal combustion engine having a plurality of exhaust ports; said system comprising:
(a) a plurality of exhaust pipes; each of said exhaust pipes being adapted to be connected to one of said exhaust ports so as to allow exhaust emission flow to flow from one of the ports into a respective exhaust pipe;
(b) discharge means for conveying the exhaust emission flow from said exhaust pipes to the atmosphere; the exhaust emission flow generally flowing through the system in a discharge direction toward and out of said discharge means;
(c) feedback means for diverting a portion of the exhaust emission flow from said discharge direction; and
(d) a collector chamber flow connected to said exhaust pipes opposite the end thereof adapted to be connected to the exhaust ports;
(e) a pair of diverging pipes flow connected to said chamber opposite said exhaust pipes; said diverging pipes being aligned to be approximately coaxial with said exhaust pipes;
(f) a pair of S pipes, each S pipe being joined with one of said diverging pipes at one end thereof and tangentially joined to each other at an opposite end thereof;
(g) said S pipes joining to form a common discharge pipe; and
(h) said discharge pipe having a first section of larger cross-section and a second section spaced from where the S pipes join and being of reduced cross-section so as to form a diversion wall between said first and second sections; said second section having a distal end discharging into the air.

* * * * *